United States Patent [19]

Collins

[11] Patent Number: 4,588,292

[45] Date of Patent: May 13, 1986

[54] UNIVERSAL DOCUMENT VALIDATOR

[75] Inventor: James D. Collins, Holland, Mich.

[73] Assignee: Rowe International, Inc., Whippany, N.J.

[21] Appl. No.: 494,857

[22] Filed: May 16, 1983

[51] Int. Cl.[4] ........................ G06K 9/74; G01N 21/59; G01N 21/86

[52] U.S. Cl. ........................................ 356/71; 209/534; 250/556; 356/73; 356/435; 364/571

[58] Field of Search .................. 356/71, 434, 435, 448, 356/73; 209/534, 535–536; 250/559, 205, 556, 214 AG, 214 C, 223 R; 364/571, 525–526; 382/7

[56] References Cited

U.S. PATENT DOCUMENTS

| | | | |
|---|---|---|---|
| 4,097,732 | 6/1978 | Krause et al. | 356/434 X |
| 4,255,057 | 3/1981 | Williams | 250/559 X |
| 4,429,991 | 2/1984 | Williams | 356/71 X |
| 4,482,058 | 11/1984 | Steiner | 209/534 |
| 4,486,098 | 12/1984 | Buchegger et al. | 250/223 R X |
| 4,542,829 | 9/1985 | Emery et al. | 356/71 X |

*Primary Examiner*—Vincent P. McGraw
*Assistant Examiner*—Robert D. V. Thompson, III
*Attorney, Agent, or Firm*—Shenier & O'Connor

[57] ABSTRACT

An improved universal document validator in which a document is transported along a path past light detectors and associated light sources positioned above and below the path, such that light from the sources is directed toward the path and reflected onto the detectors to produce outputs therefrom. A first stored value representing the desired output of each detector with no document in the transport path and with its associated light source illuminated is divided by the actual output of each detector with no document in the transport path and with its associated light source illuminated, to produce a plurality of quotients. If any of the quotients falls outside a predetermined range, the validator turns itself off. A microprocessor control system uses the outputs of the detectors with a document in the transport path together with the quotients to produce an indication of the validity of the document.

5 Claims, 5 Drawing Figures

UNIVERSAL DOCUMENT VALIDATOR

FIELD OF THE INVENTION

My invention relates to the field of document validators and, more particularly, to an improved universal document validator which compensates for variations in the operation of the components of the validation apparatus.

BACKGROUND OF THE INVENTION

Many systems are known in the prior art for validating documents and, particularly, for validating pieces of currency either to permit change to be given or to establish a credit for the sale of goods or services. In some of these systems of the prior art, light from at least one source may be directed toward the document to be validated and either reflected or transmitted light or both may be sensed by suitable detectors to determine an optical characteristic of the document under test. While these systems operate in a generally satisfactory manner, their reliability may be adversely affected by variations in light source intensity and detector sensitivity such that they may reject what is a genuine document, while at the same time accepting a bogus document.

Variations in light source intensity and detector sensitivity may, for example, be caused by gradual degradation of intensity and sensitivity over the lifetime of the source and detector, variations in the light source supply voltage and the effects of changes in ambient temperature. Many document validators are adapted to compensate for variations in light source intensity, such for example as those shown in Gorgone et al U.S. Pat. No. 4,147,430, Iannadrea et al U.S. Pat. No. 4,183,665, Gorgone et al U.S. Pat. No. 4,127,328 and Haville U.S. Pat. No. 3,340,978. Each of the above systems, however, utilize a separate light detector for monitoring the light source and none compensate for variations in the sensitivity of the light detectors used for validation purposes.

Williams U.S. Pat. No. 4,255,057, issued Mar. 10, 1981, describes a system for determining the quality of currency in which a bill is illuminated by a light source and a pair of detectors and converters provide a first voltage output proportional to the amount of light transmitted through the bill and a second voltage output proportional to the amount of light reflected from the bill. Variations in the light source are compensated for by the use of a peak detector circuit which holds a voltage measured by the transmission detector when no bill is in place. The first and second voltage outputs are then divided by the voltage output of the peak detector and used to obtain a voltage proportional to the light absorbed by the bill independent of variations in light source intensity. This "absorption" voltage determines the quality of the bill.

While the system disclosed in Williams compensates for variations in light source intensity without the use of separate detectors, it does not compensate for variations in the sensitivity of both the reflection and the transmission detectors nor does it provide a system for monitoring the intensity of more than one light source.

SUMMARY OF THE INVENTION

One object of my invention is to provide an improved universal document validator which compensates for variations in the intensity of each individual light source.

Another object of my invention is to provide an improved universal document validator which compensates for variations in the sensitivity of each individual light detector.

Still another object of my invention is to provide an improved universal document validator which, in response to a gross variation in the output of any light source or detector from a predetermined normal condition, inhibits further operation of the validator.

A further object of my invention is to provide an improved universal document validator which collects data from both sides of the document to be validated.

Other and further objects of my invention will appear from the following description.

BRIEF DESCRIPTION OF THE DRAWINGS

In the accompanying drawings to which reference is made in the accompanying specification and which is to be read in conjunction therewith, and in which like reference characters are used to indicate like parts in the various views.

DESCRIPTION OF THE PREFERRED EMBODIMENT

Figure 1:
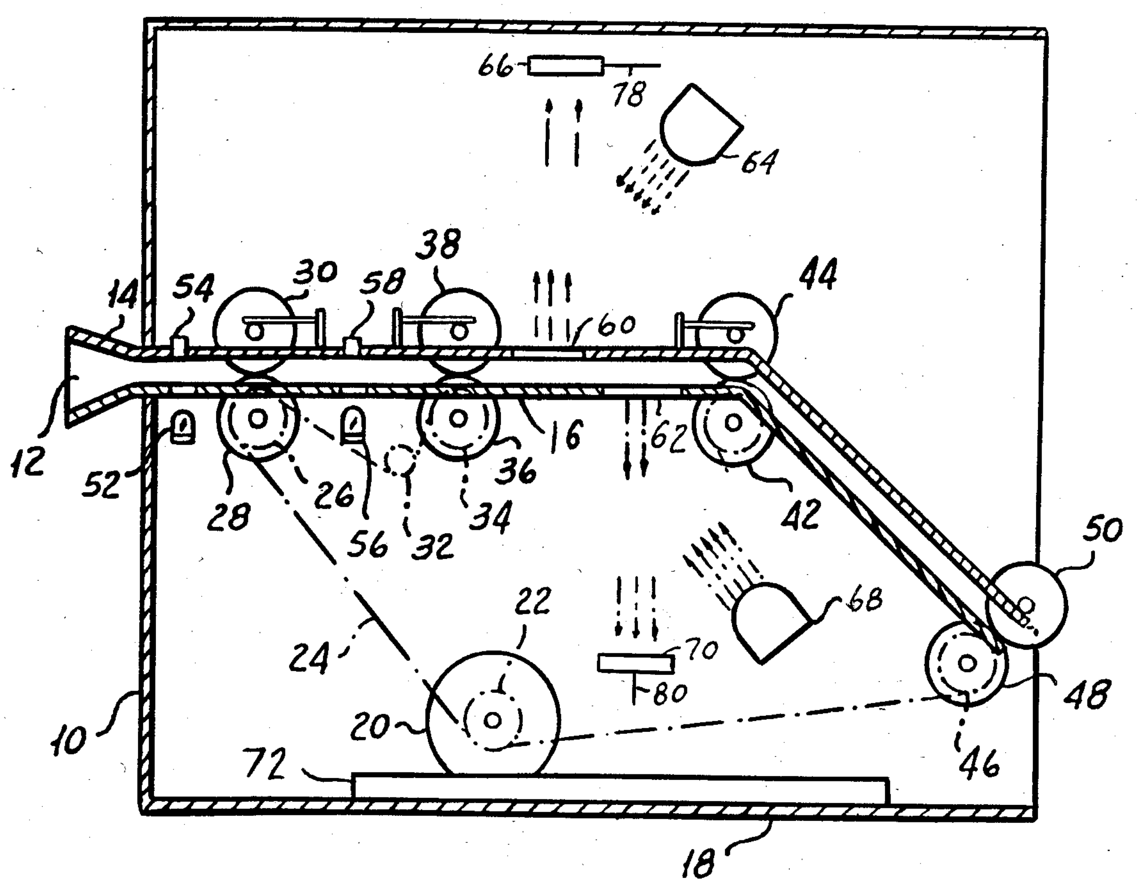
FIG. 1 is a sectional view of one form of my universal document validator.

Referring now to FIG. 1 of the drawings, my improved universal document validator includes a housing 10 having an inlet mouth 12 leading into the space between an upper guide 14 and a lower guide 16. The base 18 of the housing 10 supports a reversible motor 20, the shaft of which carries a sprocket wheel 22 adapted to drive a pitch chain 24. Chain 24 engages a first sprocket wheel 26 adapted to drive the lower roller 28 of a first pair of rollers including a pressure roller 30 urged into engagement with roller 28. The chain 24 extends around an idler sprocket 32 supported on the housing 10 in such a manner as to permit adjustment of the tension in the chain in a manner known to the art to a sprocket wheel 34 adapted to drive an intermediate roller 36 having associated therewith another roller 38, resiliently urged into engagement with the roller 36. From sprocket wheel 34 a chain 24 passes to a sprocket wheel 40 adapted to drive a lower roller 42 associated with an upper roller 44 resiliently urged into engagement with the lower roller 42. From sprocket wheel 40, chain 24 extends around sprocket wheel 46 and back to the wheel 22. Wheel 46 is adapted to drive a roller 48 having an upper roller 50 associated therewith.

In one form of my improved universal document validator the leading edge of a document to be validated is inserted into the mouth 12, so as to interrupt the passage of light from a source 52 toward a detector 54. In response to this action, motor 20 is energized in the forward direction to cause roller 28 to advance the bill along the passage formed by the upper guide 14 and the lower guide 16. When the bill arrives at a predetermined location along the transport path, light from a source 56 is prevented from energizing a photocell 58 to a level sufficient to initiate further operation of the machine. Stated otherwise, interruption of this light beam either by the leading edge of the bill itself or by the leading edge of printing initiates further operation of my universal bill acceptor. I so arrange my system as to cause this bill position sensing system to start the validating operation, for example, when a predetermined area of the bill is over a window 60 formed in the upper guide 14, and when a predetermined area of the bill is over a window 62 formed in the lower guide 16.

As will be more fully described hereinbelow, when the validation operation is to take place, light from a source 64 which may, for example, be a standard incandescent light bulb, is adapted to illuminate the area of the document below the window 60. Light reflected from this area of the upper side of the document impinges on a suitable light detector or solar cell 66 which generates a voltage output proportional to the intensity of the reflected light. Light from a source 68 is adapted to illuminate the area of the document above the window 62. Light reflected from this area of the lower side of the document impinges on a suitable light detector or solar cell 70 which generates a voltage output proportional to the intensity of the reflected light. It will readily be appreciated that while a minimum of two solar cells, each mounted on opposite sides of the document to be validated with an associated light source, will provide the signals necessary for proper operation of my validator for most types of documents, additional cells and light sources could be accommodated by my system. A microprocessor control circuit responsive to the various input signals of the system may be housed in any suitable subhousing, such for example as the subhousing 72.

Figure 2:
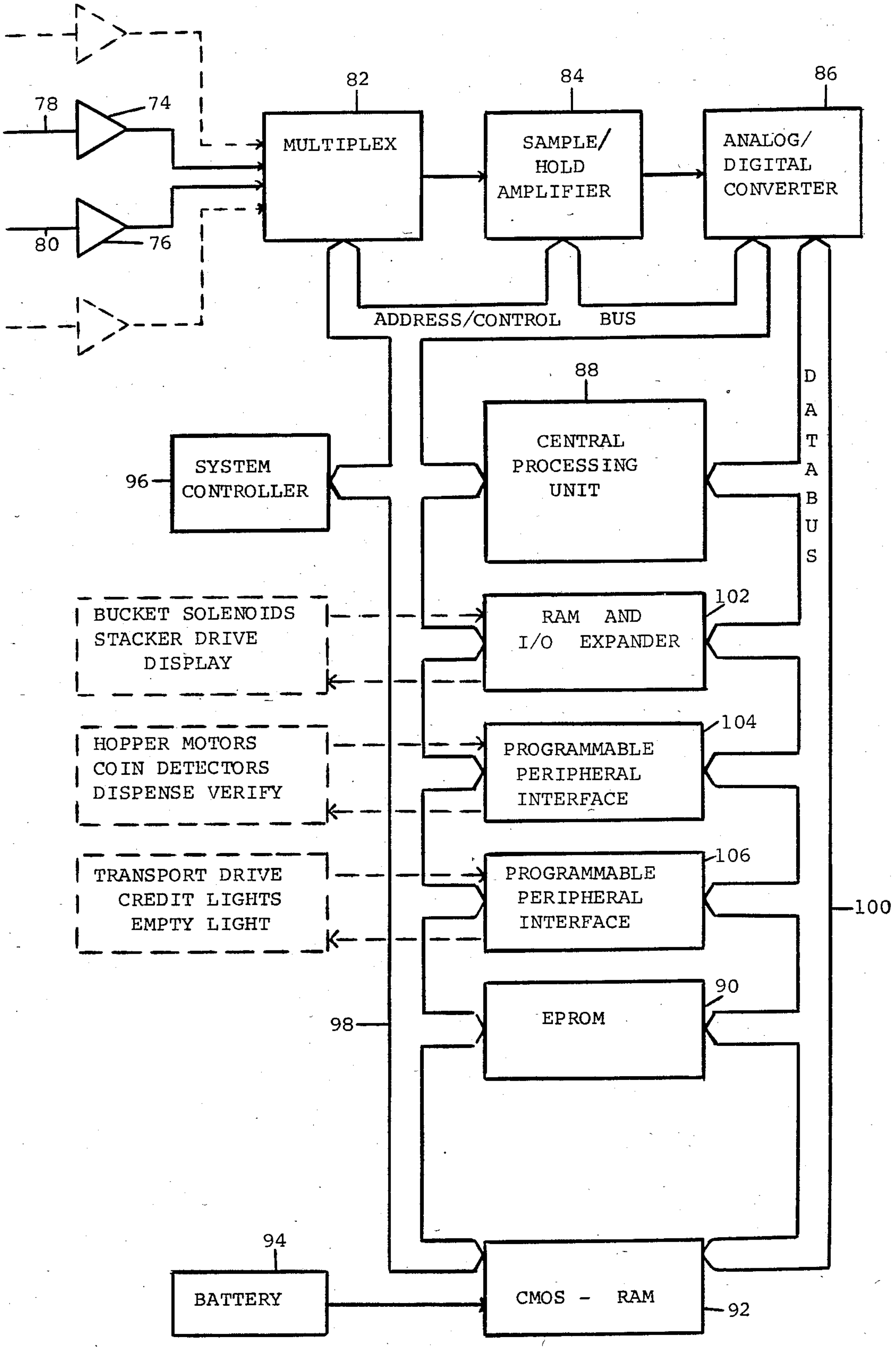
FIG. 2 is a block diagram of the microprocessor control circuit for use with the system shown in FIG. 1.

Referring now to FIG. 2, I couple the outputs of respective solar cells 66 and 70 to preamplifiers 74 and 76 through lines 78 and 80. I have shown additional amplifiers, indicated by the dotted lines, to receive the output of additional solar cells, if used. I connect the output of each of the amplifiers to an analog signal multiplexer 82 which switches each of the signals in its turn to a sample and hold circuit 84. Circuit 84 provides an analog to digital converter 86 with a "held" or constant DC voltage which represents the output of the particular cell at the time the hold command was issued, and converter 86 generates a digital representation of this output. Each of the solar cells may be polled a number of times in the course of passage of a document through the validator to provide as many data outputs or "pictures" of predetermined areas of the document as desirable or as required.

The multiplexer 82, the sample and hold circuit 84 and the analog to digital converter 86 are each controlled by a central processing unit 88 which forms part of one form of microprocessor control circuit which may be used to control the operation of my improved universal document validator. The central processing unit 88 multiplies the values generated by the analog to digital converter 86 by a correction factor to be more fully described hereinbelow, unique to each solar cell and stores the corrected values in a temporary data storage memory such, for example, as a CMOS RAM (92). This process is repeated until the document has passed through the scanning area, the region adjacent windows 60 and 62, leaving the memory 90 filled with the values taken from many areas on both sides of the document. As will be more fully described hereinbelow, the central processing unit 88 compares these values to a predetermined set of limits to determine if a sufficient match exists, whether or not the values fall within the predetermined limits for a valid document of the type in which case proper credit indication or payout is provided. The limits are stored in a non-volatile memory such, for example, as a CMOS random access memory 92 provided with a battery 94 as a backup power source when power fails, so as to preserve the stored limits. In addition, other predetermined sets of limits may be stored in the memory 92, so that in the event of a mismatch with one set of limits, the central processing unit 88 would compare the measured values to the other limit sets giving proper credit indication or payout should a match be found with another set of limits. If no match is found the document is returned to the customer or operator.

The microprocessor control circuit also includes a program memory such, for example, as a read only memory or EPROM 90, within which is stored the operating program and a system controller 96 which selects the integrated circuit or "chip" with which the central processing unit 88 will communicate through an address/control bus 98 and a data bus 100. The microprocessor control circuit may also control other standard machine functions, not shown, typical to a document validator and bill changer. For example, a random access memory and input/output expander 102 may control bucket solenoids which are activated to deliver the proper coin combination to a customer in response to a payout signal, a stacker drive adapted to be activated to stack accepted documents and a suitable display, such as a diagnostic display for use by a service person. A first programmable peripheral interface 104 may receive input from and provide output to hopper motors which are activated to deliver the correct coin combinations to the dispensing buckets from coin hoppers, coin detectors to monitor the supply of coins in each hopper, and a sensor adapted to verify the dispensing of coins to a customer. A second programmable peripheral interface 106 may operate the transport drive motor 20, illuminate credit lights, provide a credit signal and illuminate an empty light. Since the details of the control and operation of the above mentioned functions do not form part of my invention, they will not be described in detail.

The correction factors, mentioned above, serve to compensate for variations in light source intensity and solar cell sensitivity, as well as amplifier gain errors. A correction factor is computed for each solar cell in the following manner. A standard or "correct for" number represents the digital value of the output of each solar cell measured with no document in the scanning area and with its associated light source illuminated, assuming normal light source intensity, normal solar cell sensitivity, normal amplifier gain, and normal operation of the multiplex 82, the sample and hold amplifier 84 and the analog to digital converter 86. This standard or "correct for" number is stored in the non-volatile CMOS random access memory 92. At set intervals during normal operation of the validator, each cell's output is actually measured with no document in the scanning area and with its associated light source illuminated. A digital value is generated by the converter 86 for each cell, and the correction factor for each cell is determined by dividing the standard or "correct for"

number, stored in memory 92, by the digital value of the actual cell output. Each of the correction factors is stored at a unique location in the temporary data storage memory 90 for use during the data collection process. The factors are computed at set intervals to keep them current with the actual operating conditions of the system, such that if, for example, the intensity of any of the light sources or the sensitivity of any of the solar cells changes, the corresponding correction factor would also change. In addition, each factor is tested to determine whether it falls within a predetermined set of limits necessary for proper operation of the validator. If any of the correction factors falls outside the limits, the validator inhibits operation of motor 20 to prevent acceptance of any document for validation by a grossly out of specification system.

Figure 3:
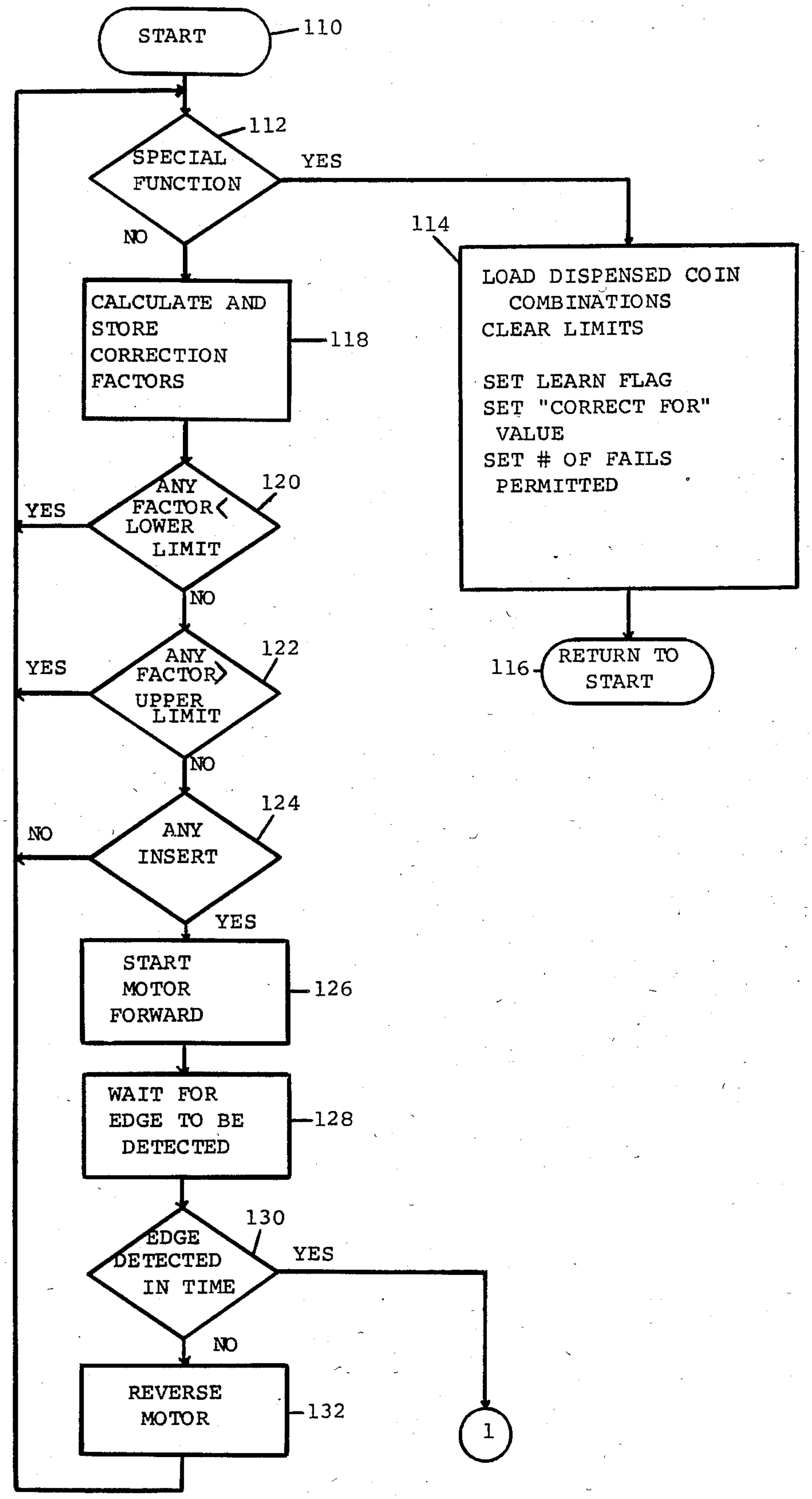
FIG. 3 is a flow chart illustrating the initial portion of the general program of my improved universal document validator.
Figure 4:
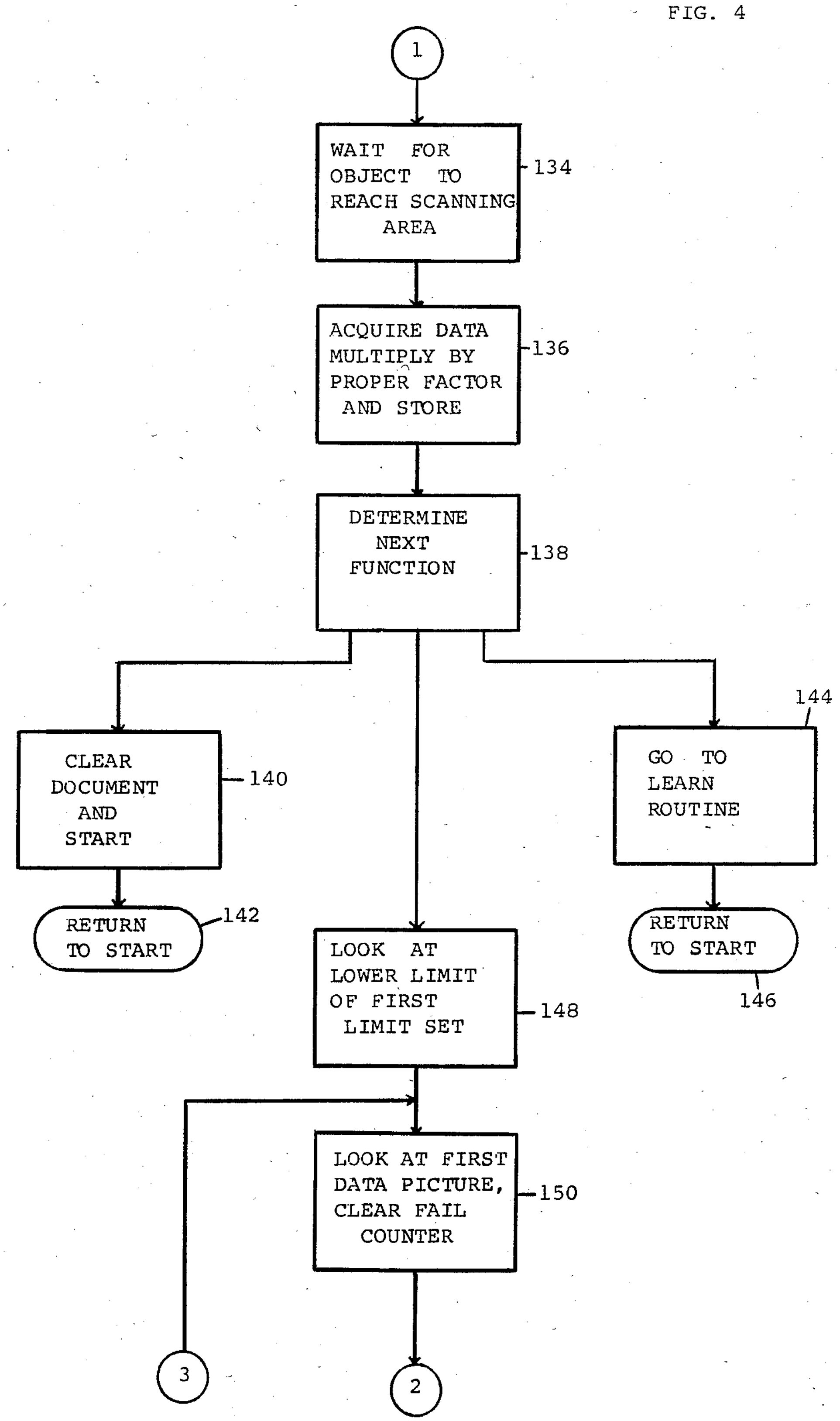
FIG. 4 is a flow chart illustrating the final part of the initial portion of the general program of my improved universal document validator.
Figure 5:
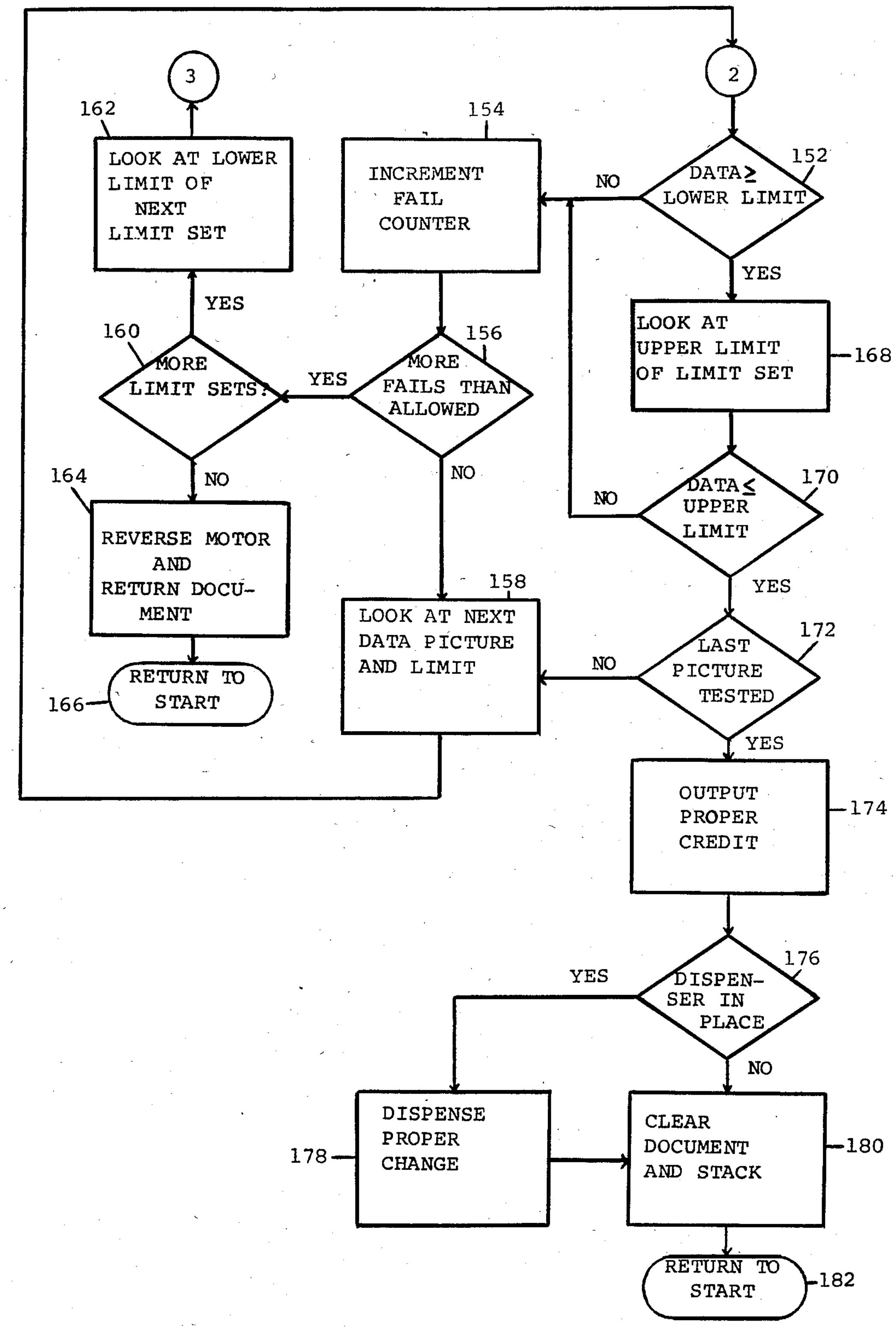
FIG. 5 is a flow chart illustrating the validating subroutine of my improved universal document validator.

The operation of my improved universal document validator can best be understood by reference to the flow charts of FIGS. 3 to 5. At the start (block 110) of the program a decision is made as to whether or not a special function is required (block 112). If so, the particular function is detected and is performed (block 114) and the system returns to start (block 116). If no special function is required, the correction factor for each solar cell is determined in the manner described above, and tested against a set of limits (blocks 118, 120 and 122). If any of the correction factors falls outside the predetermined limits, the program returns to start. The next decision is whether or not a document or bill has been inserted into the validator (block 124), which may be determined, for example, by monitoring detector 54. If no insert is detected, the program returns to start, otherwise motor 20 is energized in the forward direction to move the bill towards the scanning area (block 126).

The system then waits for the leading edge of the inserted document by monitoring detector 58 (block 128). If no edge is detected within a reasonable length of time (block 130), the motor 20 is reversed to return whatever has been inserted (block 132) and the program returns to start. If the edge is detected, the program waits for the inserted document to reach the scanning area (block 134) at which point each solar cell is polled and the required data is acquired, digitized, multiplied by the proper correction factor and stored in the temporary data storage memory 90 (block 136). The program then determines what function is next to be performed (block 138). If the system is set merely to examine the document, it can then be cleared and stacked and the program returned to start (blocks 140 and 142). If the system is set to a "learn" routine, the data just acquired forms new limits to be stored into the memory 92 and used to test future documents, and the program returns to start (blocks 144 and 146). Since such a system forms no part of my invention, the details thereof have not been shown. A learn routine for use in document validators and bill changers is shown and described in my copending application for a Universal Document Validator, U.S. patent application Ser. No. 209,518, filed Nov. 24, 1980.

Where the validator is to perform the validating function, it follows the routine set forth in blocks 148 et seq. The program looks at the first and lower limit of the first limit set and at the first data picture (block 150), and a comparison is made of the data to the limit (block 152). In addition, a fail counter is cleared.

If the data is less than the limit, the fail counter is incremented (block 154) and a decision is made as to whether or not the fail counter is above an allowed limit (block 156). If not, the program looks at the next data picture (block 158) and loops back to block 152 to compare it to the next limit of the limit set. If the fail counter is above an allowed limit, the program determines whether or not there are additional limit sets the data may be tested against (block 160). If there is, the program looks at the first and lower limit of the next limit set (block 162) and loops back to block 150 to compare it to the first data picture. If the data has been unsuccessfully tested against all the limit sets, the motor 20 is reversed (block 164), the document returned, and the program returns to start (block 166).

If, however, the data is greater than or equal to the lower limit, it is compared to the next or upper limit (blocks 168 and 170). If the data is greater than the upper limit, the fail counter is incremented (block 154) and again examined to determine if it is above the allowed limit (block 156). The results of this examination are the same as where the lower limit comparison indicated that the data was less than the lower limit. If the comparison between the data and the upper limit indicates that the data is equal to or less than the upper limit, a decision is made as to whether or not this is the last data picture to be tested (block 172). If not, the program looks at the next data picture and the next limit (block 158), looping back to block 150. If the last data picture has been tested, the proper credit is indicated (block 174) and if the dispenser is in place, the proper change is dispersed (blocks 176 and 178). The document is cleared and stacked (block 180) and the program returns to start (block 182).

It will be seen that I have accomplished the objects of my invention. I have provided an improved universal document validator which compensates for variations in the intensity of each individual light source and which compensates for variations in the sensitivity of each individual light detector. In addition, in response to a gross variation in output of any light source or light detector from a predetermined normal condition, further operation of my validator is prevented. My improved universal document validator also collects data from both sides of the document to be validated.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A device for validating domcuments including in combination means forming a document transport path having an entrance and an exit, a light detector positioned adjacent to said path, a source of light, means for directing light from said source toward a predetermined location along said path and from said predetermined location to said detector in the abasence of a document in said path to produce a first output therefrom, means corresponding to said first output representing a desired output of said detector with no document in the transport path and with light from said source directed toward said predetermined location, means for obtaining second values from second subsequent outputs of said detector in the absence of a document in said path, means for dividing said first value by said second values to produce a correction quotient, means for moving a document along said path in a direction from said entrance to said exit, means for directing light from said source over a predetermined region of said document positioned at said predetermined location along said path and from said region to said detector to produce a third output therefrom, and means responsive to said third output and said correction quotient for affording an indication of the validity of the document.

2. Apparatus as in claim 1 comprising means for storing a first reference quotient than which said correction quotient must be greater, means for storing a second reference quotient than which said correction quotient must be less, means for comparing said correction quotient with said first and second reference quotients and means responsive to said comparing means for inhibiting further operation of said device when said correction quotient is less than said first reference quotient and when said correction quotient is greater than said second reference quotient.

3. A device for validating documents including in combination means forming a document transport path having an entrance and an exit, a plurality of light detectors positioned adjacent to said path, a plurality of sources of light, means for directing light from said sources toward a plurality of respective predetermined locations along said path and from said predetermined locations respectively to said detectors in the absence of a document in said path to produce a plurality of first outputs therefrom, means for storing first values corresponding to said first outputs representing the desired output of each of said detectors with no document in the transport path and with light from said sources directed toward said predetermined locations, means for obtaining second values from second subsequent outputs of said detectors in the absence of a document in said path, means for dividing said first values by each of said corresponding second values to produce a plurality of respective correction quotients, each of said quotients corresponding to a detector and its associated light source, means for moving a document along said path in a direction from said entrance to said exit, means for directing light from said source over a plurality of predetermined regions of said document positioned at said predetermined locations along said path and from said regions to said detectors to produce a plurality of third outputs therefrom, and means responsive to said third outputs and said correction quotients for affording an indication of the validity of the document.

4. Apparatus as in claim 3 in which said plurality of light detector postioned adjacent to said path are located above and below said path and said plurality of sources of light positioned adjacent said path are located above and below said path.

5. Apparatus as in claim 4 which further comprises means for storing a first reference quotient than which each of said correction quotients must be greater, means for storing a second reference quotient than which each of said correction quotients must be less, means for comparing each of said correction quotients with said first and second reference quotients and means responsive to said comparing means for inhibiting further operation of said device when any one of said correction quotients is less than said first reference quotient and when any one of said correction quotients is greater than said second reference quotient.

* * * * *

UNITED STATES PATENT AND TRADEMARK OFFICE

CERTIFICATE OF CORRECTION

PATENT NO. : 4,588,292

DATED : May 13, 1986

INVENTOR(S) : James D. Collins

It is certified that error appears in the above-identified patent and that said Letters Patent is hereby corrected as shown below:

Column 6, line 60 - after "means" insert
-- for storing a first value --.

Signed and Sealed this

Eighth Day of September, 1992

*Attest:*

DOUGLAS B. COMER

*Attesting Officer*

*Acting Commissioner of Patents and Trademarks*